United States Patent [19]
Gray et al.

[11] Patent Number: 5,181,308
[45] Date of Patent: Jan. 26, 1993

[54] METHOD FOR INSTALLING ANNULAR SEALS

[75] Inventors: Lewis Gray, Winter Springs, Fla.; Joseph L. Garbarino, Voorhees, N.J.; John S. Micol, Durham, N.C.; Johnny W. Crenshaw, Lancaster, S.C.; Vincent M. Iacono, Wilmington, Del.; James C. Barley, Charlotte, N.C.; Richard L. Hollen, Bellwood; Terry M. Graziani, Ellwood City, both of Pa.

[73] Assignee: Westinghouse Electric Corp., Pittsburgh, Pa.

[21] Appl. No.: 733,523

[22] Filed: Jul. 22, 1991

[51] Int. Cl.$^5$ .............................................. B23P 11/00
[52] U.S. Cl. ...................................... 29/436; 29/888.3; 29/888.011; 29/888.012; 29/889.2; 277/1; 409/293
[58] Field of Search ................. 29/888.3, 436, 888.011, 29/888.012, 888, 281.1, 404, 402.2, 402.6; 415/174.2; 277/1, 9.5, 120, 148, 149, 150; 269/76, 47, 50, 54.2, 54.3; 408/708; 409/293, 305, 309

[56] References Cited

U.S. PATENT DOCUMENTS

| 1,339,297 | 5/1920 | Spicer | 277/149 X |
| 3,286,335 | 11/1966 | Di Pietra | 29/888.3 |
| 3,501,246 | 3/1970 | Hickey | 415/174.2 |
| 3,768,817 | 10/1973 | Daniels | 277/148 |
| 3,971,119 | 7/1976 | Walker | 29/888.3 X |
| 4,274,575 | 6/1981 | Flower | 415/174.2 X |

Primary Examiner—Mark Rosenbaum
Assistant Examiner—S. Thomas Hughes

[57] ABSTRACT

A method of installing a seal having a sealing surface in a defined operating position in a rotating machine composed of a stationary part which carries the seal and a rotary part mounted to rotate about an axis of rotation and having a cylindrical surface located to rotate adjacent, and in close proximity, to the sealing surface, which method includes: installing the seal on the stationary part in a position corresponding to the defined operating position so that the seal is immovable relative to the stationary part; machining the sealing surface to a desired final dimension by mounting a machine tool to rotate about the axis of rotation and rotating the tool about that axis; withdrawing the tool; and modifying the installation of the seal so that the seal is supported in the defined operating position so as to be resiliently movable relative to the stationary part.

10 Claims, 1 Drawing Sheet

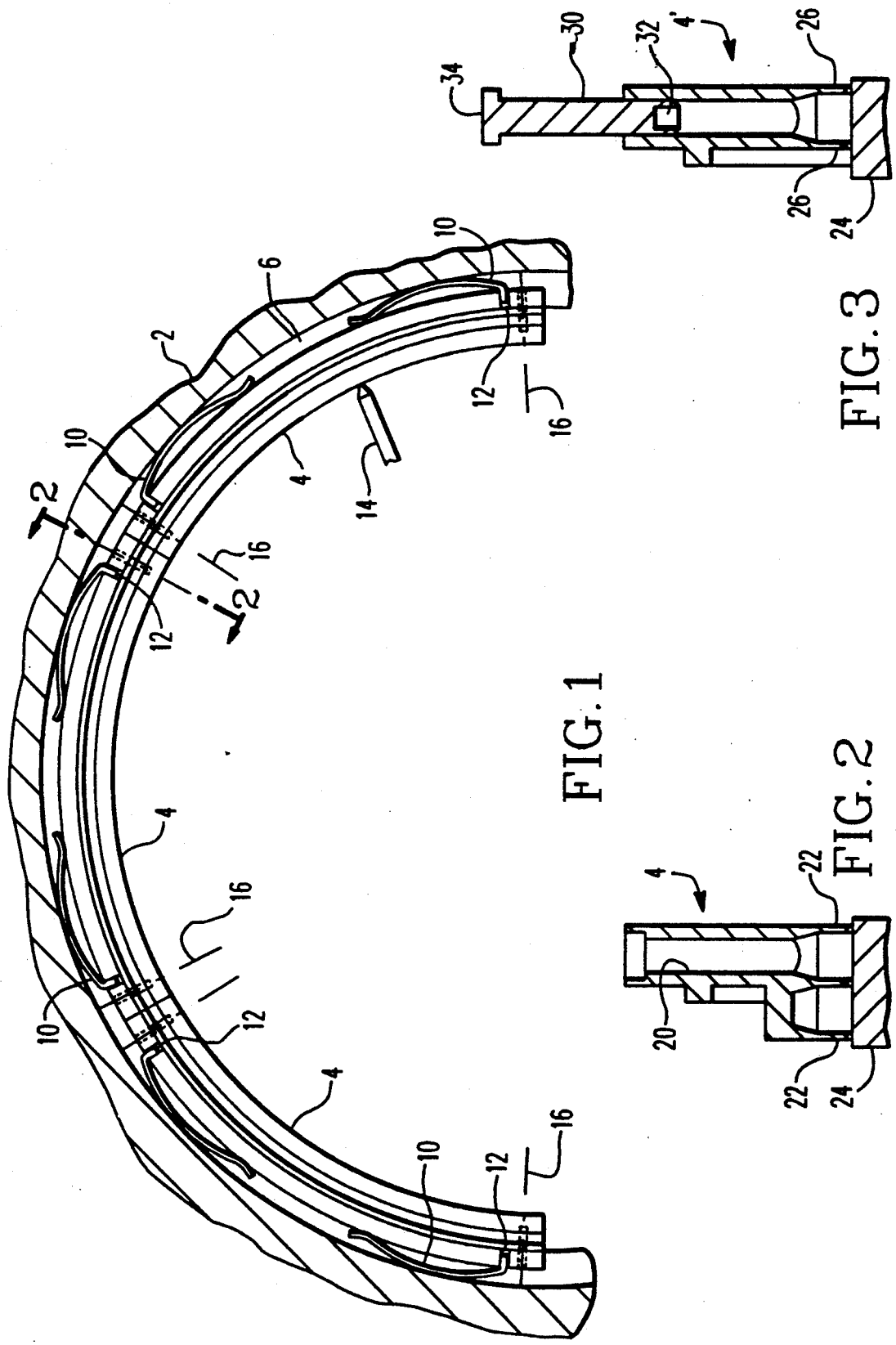

METHOD FOR INSTALLING ANNULAR SEALS

BACKGROUND OF THE INVENTION

The present invention relates to the construction of rotating machines, and particularly to the installation of annular seals on a stationary part of the machine.

The purpose of such seals is to inhibit the flow of fluid around a rotating part. By way of example, such seals are employed in turbines to prevent the driving fluid, e.g. steam or gas, from bypassing the turbine blades. The effectiveness of such a seal depends on the precision of the gap formed with the rotating part. One factor influencing the size of this gap is the eccentricity between the axis of rotation of the rotating part and the geometric axis of the stationary part. It is generally impossible, for economic reasons, to completely eliminate this eccentricity. Heretofore, it has been necessary to tolerate a relatively large gap between the seal and the rotating part or to perform costly and time-consuming machining operations on the seal.

SUMMARY OF THE INVENTION

It is an object of the present invention to install such a seal in a manner to establish a small seal gap.

A further object of the invention is to match a seal to its associated rotating part in an economical manner.

Yet another object of the invention is to accurately machine the seal to conform closely to the rotating part in a rapid and economical manner.

The above and other objects are achieved, according to the invention, by a method of installing a seal having a sealing surface in a defined operating position in a rotating machine composed of a stationary part which carries the seal and a rotary part mounted to rotate about an axis of rotation and having a cylindrical surface located to rotate adjacent, and in close proximity, to the sealing surface, the method comprising: installing the seal on the stationary part in a position corresponding to the defined operating position so that the seal is immovable relative to the stationary part; machining the sealing surface to a desired final dimension by mounting a machine tool to rotate about the axis of rotation and rotating the tool about that axis; withdrawing the tool; and modifying the installation of the seal so that the seal is supported in the defined operating position so as to be resiliently movable relative to the stationary part.

BRIEF DESCRIPTION OF THE DRAWING

FIG. 1 is a cross-sectional view in a plane perpendicular to the axis of a turbine, showing one-half of the stationary housing of a turbine with a seal that may be installed according to the present invention.

FIG. 2 is a cross-sectional detail view along the line II—II of FIG. 1 of one possible embodiment of a seal employed in the practice of the present invention.

FIG. 3 is a view similar to that of FIG. 2 showing a seal according to a further embodiment of the invention.

DESCRIPTION OF THE PREFERRED EMBODIMENTS

FIG. 1 illustrates one-half of a stationary member 2 of a turbine in which is to be installed a rotor composed of a plurality of rows of turbine blades. Typically, each row of turbine blades is associated with an annular seal carried by stationary member 2 to prevent steam from flowing around the turbine blade row. Such a seal may be composed of a plurality of identical segments 4, the seal shown in FIG. 1 being composed of six such segments 4, three of which segments are illustrated in FIG. 1.

When installed in their desired operating position, segments 4 abut one another at radially extending edges and are supported in an annular groove 6 of housing member 2 by leaf springs 10. Each spring 10 is secured in a respective groove 12 of an associated segment 4 and presses against the base of groove 6.

The action of springs 10 and the engagement between adjacent end faces of segments 4 maintains the seal in the desired position relative to the stationary housing. The precise manner of mounting the seal in stationary member 2 is known in the art.

A seal composed of segments 4 is to be installed in order to seal the region surrounding a row of turbine blades, and thus assure that substantially all steam flowing through the turbine will act on the blades. Heretofore, the segments have been machined as carefully as possible prior to installation in an attempt to achieve the desired sealing effect, which involves maintenance of a small defined gap between the turbine blade row and the seal. Since, however, variations exist from one turbine to another, particularly with regard to the precise location of the axis of rotation of the turbine blades it has proven difficult to achieve as effective a seal as desired.

According to the invention, an improved seal is produced by machining the inner periphery of the seal while the seal is in its installed position in member 2 by means of a machine tool 14 which is installed to rotate about the same axis of rotation as the turbine blades. As a result, when the blades are installed, precisely the desired spacing will exist between each seal and its associated turbine blade row.

To achieve this result, each seal is associated with two jacking screws, each fastened to a respective segment to extend along a respective longitudinal axis 16. One embodiment of a seal segment according to the present invention is shown in FIG. 2 and includes a threaded bore 20 for receiving a jacking screw. As is further shown in FIG. 2, seal 4 may have three sealing edges 22 arranged to be radially spaced, with a small gap, from a shroud 24 of an associated row of turbine blades.

Referring to FIGS. 1 and 2 together, according to the present invention, the segments 4 of a complete seal are installed in groove 6 of part 2, and are supported by springs 10, and by one another, to be in their desired installed position relative to housing 2. At this time, jacking screws are present in bores 20. Each jacking screw has a radial inner end provided with a drive head, e.g. a slotted head, Phillips head, Allen head, Torx head etc., and a radial outer end which is provided to engage the base of groove 6.

Initially the seal is supported only by springs 10 and the outer end of each screw is retracted inwardly from the base of groove 6.

Then, acting on each jacking screw from the region enclosed by the seal, each screw is advanced radially outwardly to press against the base of groove 6 so that the seal is held rigidly while remaining in its desired installed position. During this step, the screws are extended in a manner to avoid disturbing the position of the seal.

Then, a cutting tool 14, such as a boring bar, is installed within the stationary part so that the axis of rotation of the tool corresponds precisely to that of the subsequently installed rotating part of the turbine. For example, the tool may be mounted in bearings secured in part 2 to support the rotary part. The tool is then operated to machine the sealing edges 22 so that the seal is given its desired final inner diameter.

Then, the tool is withdrawn, each jacking screw is removed and, if desired, replaced with a cap screw which is screwed down into bore 20 so that the bore is sealed.

Thereafter, a rotating part can be installed and assembly of the machine completed.

It will be understood that in an embodiment of the type described above, the rotating part may have a plurality of rows of turbine blades, each having, at its outer periphery, a shroud, along with a plurality of seals each associated with the shroud of a respective turbine blade row, in the same manner as shown in FIGS. 1 and 2. Any number of the seals can be machined during the same machining step.

In the process described above, each cap screw which is installed after removal of the jacking screws may be permanently fixed in place, as by welding or upsetting, to assure that these screws will not work loose and enter the path of the turbine blades.

According to a further embodiment of the present invention, the step of replacing jacking screws with cap screws can be eliminated. FIG. 3 shows a segment 4' which happens to have two sealing edges 26, rather than the three edges 22 shown in FIG. 2. In this regard, the illustration provided in FIG. 3 is merely intended to indicate that the number of sealing edges may be varied.

That which distinguishes the embodiment shown in FIG. 3 is that it is provided with a jacking screw 30 which is provided at its radially outwardly disposed end with a portion defining a shoulder 34 which will bear against the base of groove 6 when screw 30 is extended radially outwardly prior to machining, and will bear the radial outer end of segment 4' when screw 30 is retracted radially inwardly so as to be retracted by the greatest possible distance from the base of recess 6.

When each ring segment has the structure shown in FIG. 3, installation is greatly facilitated because screws 30 need not be removed after machining. Rather, it is only necessary to retract each screw 30 in the radial inward direction so that each segment is supported fully by its associated pair of springs 10.

Then, in further accordance with the invention, retention of each screw 30 in its retracted position is assured by upsetting, peening, tack welding, etc. each screw 30 to its associated segment 4' at the radial inward end of screw 30.

It will be appreciated that the invention can be applied to segmented rings having any number of segments, rings having 4, 8 and 16 segments being most common in machines contemplated by the present invention.

The invention may be applied to any turbine, the embodiments illustrated herein having been developed for use with turbines which are currently installed in utility power plants.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of installing a seal having a cylindrical sealing surface in a defined operating position in a rotating machine composed of a stationary part which carries the seal and a rotary part mounted to rotate about an axis of rotation and having a cylindrical surface located to rotate adjacent, and in close proximity, to the sealing surface, said method comprising: installing the seal on the stationary part in a position corresponding to the defined operating position so that the seal is immovable relative to the stationary part and machining the sealing surface to a final dimension corresponding to the cylindrical surface of the rotary part by mounting a machine tool to rotate about the axis of rotation and rotating the tool about that axis; withdrawing the tool; and modifying the installation of the seal so that the seal is supported in the defined operating position so as to be resiliently movable relative to the stationary part.

2. A method as defined in claim 1 wherein said step of installing comprises providing the seal with a plurality of jacking screws which are movable relative to the seal in radial directions relative to the axis of rotation of the rotary part, and moving each jacking screw such that each jacking screw engages the stationary part.

3. A method as defined in claim 2 wherein the seal has an annular form and encloses a space to be occupied by the rotary part and said step of moving each screw is carried out by acting on each screw from the space enclosed by the seal.

4. A method as defined in claim 1 wherein said steps of installing, machining, withdrawing and modifying are carried out prior to installation of the rotary part, and comprising the subsequent step of installing the rotary part in position adjacent the seal.

5. A method as defined in claim 2 wherein said step of installing further comprises, prior to said step of moving each screw, providing the seal with a plurality of supporting springs and positioning the seal relative to the stationary part so that the seal is supported by the stationary part via the springs.

6. A method as defined in claim 5 wherein said step of modifying the installation of the seal comprises retracting the jacking screws in radial inward directions out of contact with the stationary part.

7. A method as defined in claim 6 wherein said step of modifying the installation of the seal comprises, after said step of retracting, securing each screw in place relative to the seal.

8. A method as defined in claim 7 wherein said step of securing is carried out by upsetting, peening, or tack welding each screw.

9. A method as defined in claim 8 wherein each screw is configured to be movable, during said retracting step, to a defined retracted position.

10. A method as defined in claim 9 wherein each screw has an enlarged radial outer end which limits radial inward movement relative to the seal.

* * * * *